Figure 1:
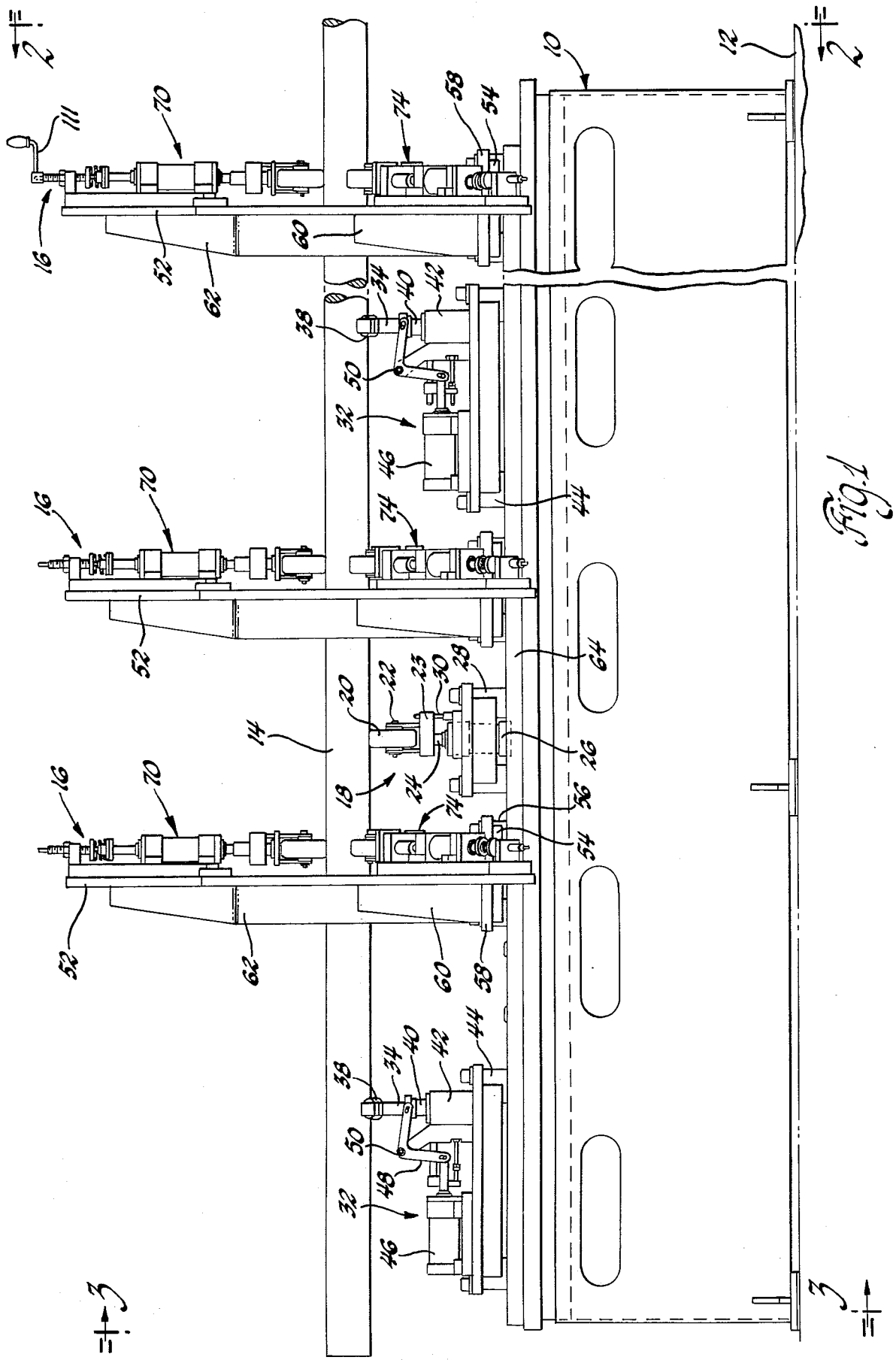

United States Patent [19]

Abu-Akeel et al.

[11] 4,044,861

[45] Aug. 30, 1977

[54] SUPPORT DEVICE FOR ROTATING BAR INCLUDING AN ASSEMBLY FOR CUSHIONING AND DAMPENING VIBRATORY MOVEMENT OF THE BAR

[75] Inventors: Abdulhadi K. Abu-Akeel; Gerald C. Rieck, both of Sterling Heights, Mich.

[73] Assignee: General Motors Corporation, Detroit, Mich.

[21] Appl. No.: 734,366

[22] Filed: Oct. 20, 1976

[51] Int. Cl.² .............................................. F16D 63/00
[52] U.S. Cl. .................................. 188/1 B; 226/186; F16D/63/00
[58] Field of Search ............................ 188/1 B, 1 B X; 214/1 F, 1 B, 338–339; 82/38 A, 39; 269/20, 24; 248/15, 20–22, 358 R; 72/DIG. 29; 144/209 R, 209 A, 251 R; 226/186, 187

[56] References Cited

U.S. PATENT DOCUMENTS

| | | | |
|---|---|---|---|
| 2,577,277 | 12/1951 | Schulz et al. | 82/39 |
| 3,101,015 | 8/1963 | Schuetz | 82/39 X |
| 3,207,014 | 9/1965 | Carlstedt | 188/1 B |
| 3,314,503 | 4/1967 | Neubert | 188/1 B |

*Primary Examiner*—Trygve M. Blix
*Assistant Examiner*—Douglas C. Butler

[57] ABSTRACT

A support device for a long rotating cylindrical bar that includes three hydraulic cylinders located in a common vertical plane and each having a roller for supporting the bar. The hydraulic cylinders are located in a hydraulic circuit which includes an assembly for cushioning and dampening vibratory movement of the bar during high speed rotation thereof.

2 Claims, 5 Drawing Figures

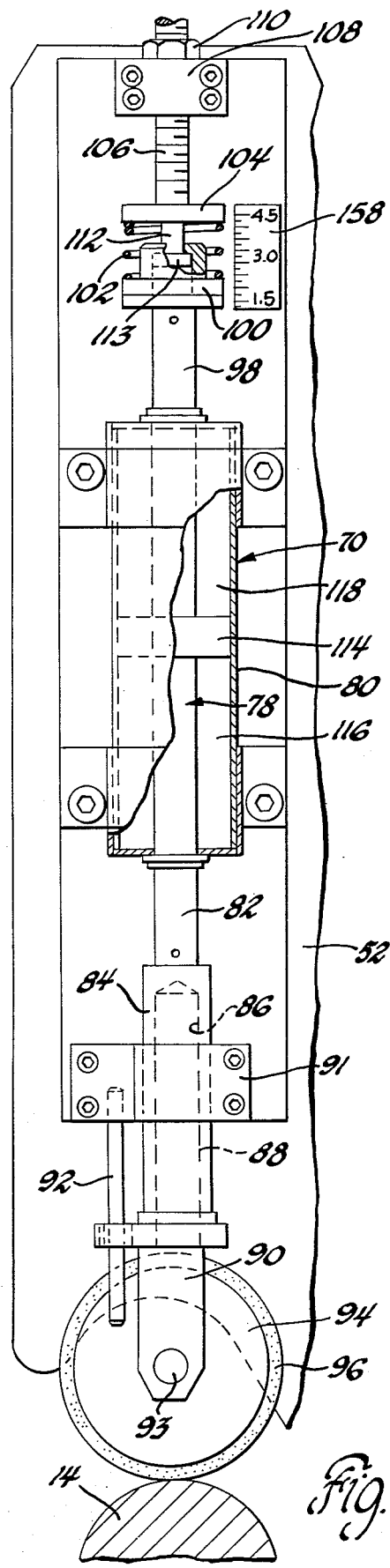
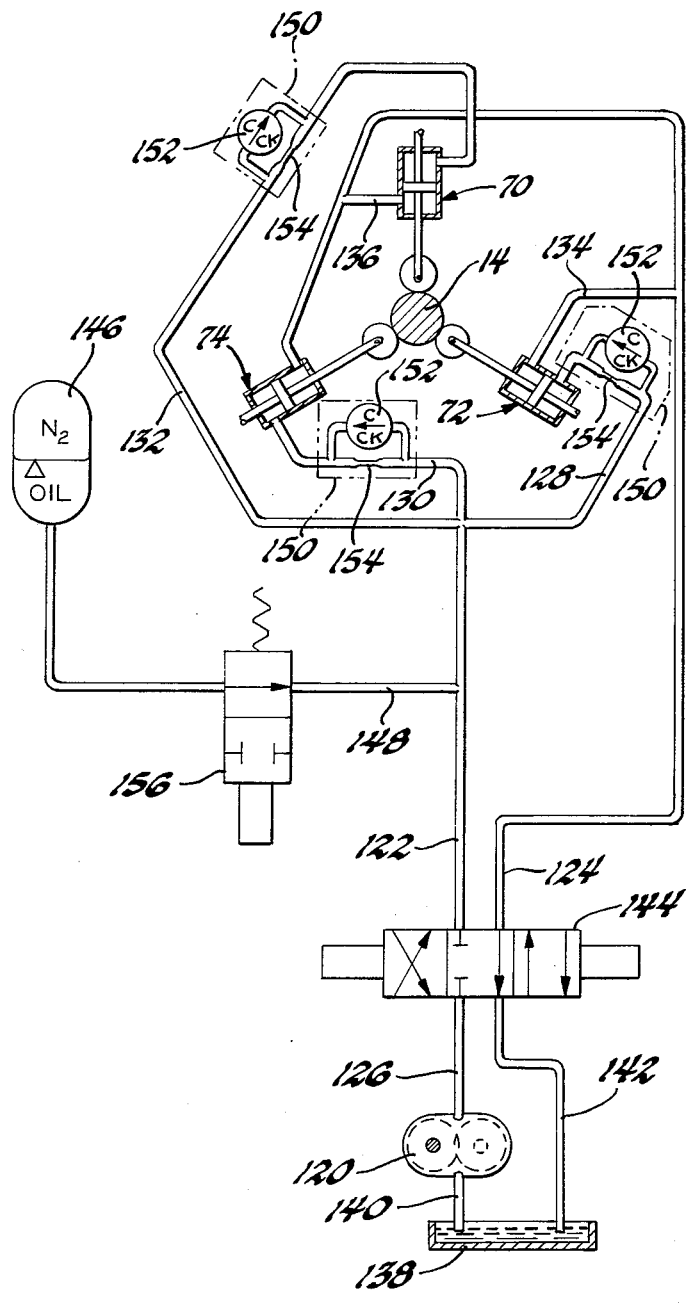
Fig.4
Fig.5

SUPPORT DEVICE FOR ROTATING BAR INCLUDING AN ASSEMBLY FOR CUSHIONING AND DAMPENING VIBRATORY MOVEMENT OF THE BAR

This invention relates to a device for dampening the vibrational movement of a long rotating bar and more specifically concerns a device for controlling the tendency of long slender cylindrical bars to whip due to centrifugal forces of unbalance or when rotated at or near their critical speeds of rotation.

Shaft whip or whirl is a phenomenon characterized by a shift between the elastic line and the axis of rotation of a long slender bar when rotated at or near the critical speeds of the bar. The critical speeds can be estimated and depend on the geometry and material of the bar and the manner of mounting the bar to a fixed frame. Although this penomenon is physical in nature, it can be aggravated if the bar has a mass unbalance or is not geometrically straight. Centrifugal unbalance forces are thus generated which force the elastic line of the bar to shift away from the axis of rotation at all speeds. The effect of whirl is thus experienced at any speed depending on the magnitude of the mass unbalance, the speed of rotation, and whether or not the bar approaches the critical speed.

One method of preventing the bar whip in the case of uniform slender bars is to support the bar with a number of support bearings. If, however, the bar is outside of a commercially feasible range of tolerance limits on roundness or straightness, multiple bearing supports are not commonly used. The method currently in use in such case involves a fixed harness tube to enclose the bar and prevent its unsupported length from shifting too far away from the axis of rotation. The tube is supported by fixed stands and may be continuously cylindrical or split and hinged lengthwise to allow loading the bar into the tube from a side. Sound deadening means are sometimes used as linings in these tubes.

The problem with supporting a bar with bearings is that the bearing support cannot be applied to out-of-round, non-straight bars, or bars of relatively rough external surface. Another problem with bearing supports is that they require a high degree of accuracy in setting the supports for long shafts and this can be very costly. Also, bearing supports require a shaft of a fixed length that is not allowed to move axially inside the bearing.

The harness tube support also has certain shortcomings. For example, the harness tube tends to generate high friction and impact forces between the rotating bar and the inner surface of the fixed tube resulting in mars and scrapes on the bar surface and a reduction in machine efficiency by consuming appreciable power through friction. Also, different size bars normally require different size tubes, and side bar loading can be a problem.

The present invention alleviates the above-mentioned difficulties by providing a plurality of support devices for a long rotating bar with each of the support devices utilizing a three roller approach wherein each roller is connected to a resiliently damped support. More specifically, each support device, according to the invention, includes an adjustably movable vertical base located on an elongated table. The support device includes three hydraulic cylinders located in a common vertical plane with the longitudinal center axis of each cylinder being angularly spaced from the longitudinal center axis of the adjacent cylinder by 120° and with each of the cylinders having the inner end thereof located adjacent the center of the bar. A double rod piston is reciprocably mounted in each cylinder so as to provide a pair of variable volume chambers with one of the chambers being located at the inner end of the cylinder and the other chamber being located at the outer end of the cylinder. A roller is connected to the piston in each of the cylinders adjacent the inner end thereof and is adapted to engage the peripheral surface of the bar. A hydraulic circuit is provided for interconnecting the cylinders and the circuit includes a pump for selectively directing pressurized hydraulic fluid to the outer end of each of said cylinders for causing the associated roller to engage the outer periphery of said cylindrical bar. The hydraulic circuit also includes valve means for fluidly connecting the outer ends of the three cylinders to an accumulator which serves as a spring for cushioning the movement of the rollers. In addition, a flow control valve is located in the circuit between the outer end of each cylinder and the accumulator for dampening vibratory movement of the cylindrical bar during high speed rotation thereof.

The objects of the present invention are to provide a new and improved support device for long rotating bars that serves to dampen the vibrational movement thereof when the bar is rotated at or near its critical speed of rotation; to provide an improved support device for a long rotating bar that is mountable on an elongated stand together with a number of identical support devices and serves to support the bar and minimize vibrational movement thereof in a manner which prevents the latter from being marred or scraped; to provide an improved supporting arrangement for a long rotating bar that is adjustable so as to accept a wide range of bar sizes and, when combined with a number of similar support devices, serves to accommodate any bar length; and to provide an improved support device for a long rotating cylindrical bar that includes three hydraulic cylinders located in a common vertical plane and controlled by a hydraulic circuit which serves to dampen vibratory movement of the cylindrical bar during high speed rotation thereof.

Figure 2:
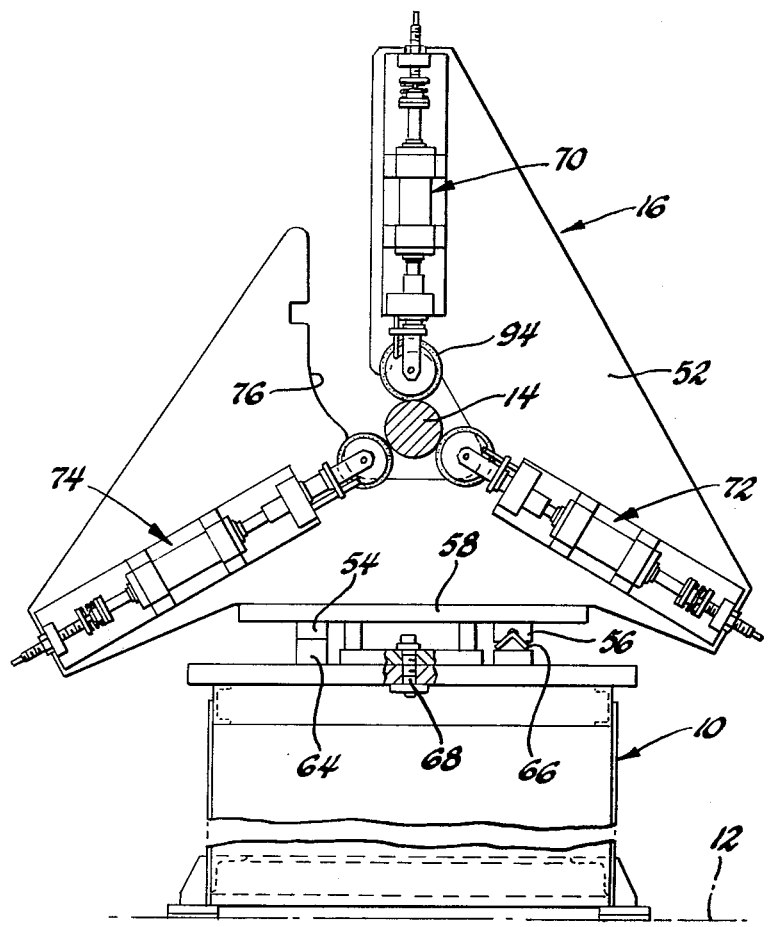
Figure 3:
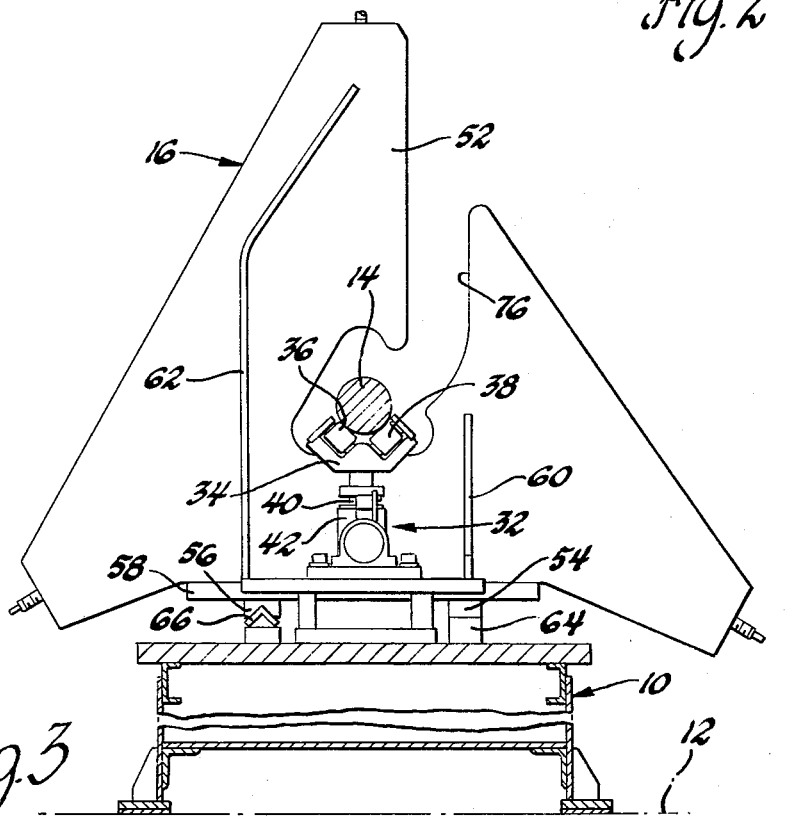

Other objects and advantages of the present invention will be more apparent from the following detailed description when taken with the drawings in which:

FIG. 1 is an elevational view showing a support stand incorporating a plurality of support devices made in accordance with the invention, FIG. 2 is a view taken on line 2—2 of FIG. 1 and shows a front elevational view of one of the support devices, FIG. 3 is a view taken on line 3—3 of FIG. 1, FIG. 4 is an enlarged view showing one of the damping cylinders incorporated with the support device of FIGS. 1 - 3, and FIG. 5 shows a hydraulic circuit for controlling dampening movement of the cylinders incorporated with each of the support devices.

Referring to the drawings and more specifically FIGS. 1 and 2 thereof, an elongated stand 10 is shown which has its lower end secured to a floor 12. The stand 10 is adapted to be positioned adjacent to a metal cutting machine such as a lathe which would be capable of receiving and performing operations on an elongated cylindrical bar 14 which, in this case, is supported by a plurality of identical support devices 16 made in accordance with the invention. Although not shown, the lathe would be positioned to the right of the stand 10 as seen in FIG. 1 and the right-hand end of the bar would extend into and be supported by the rotatable headstock of the lathe.

The bar 14 is supported along its length by the support devices 16 which are spaced from each other a distance which will depend upon the size and length of the bar and the speed at which the bar will be rotated. Additional support means is also provided along the length of the stand 10 in the form of a number of bar-weight supports, one of which only is shown in the drawings and indicated generally by reference numeral 18.

As seen in FIG. 1, the bar-weight support 18 includes a single roller 20 supported for rotation by a longitudinally extending shaft 22 and mounted through a block member 23 on a piston rod 24 of an air cylinder 26. The air cylinder 26 is fixedly held by a table 28 which is normally secured to the stand 10 and is adjustably positioned along the length thereof through means not shown. The base end of the air cylinder 26 is adapted to receive pressurized air from a source (not shown) to raise the roller 20 upwardly into contact with the bar 14 and provide primary support for the bar. Rotation of the roller 20 about the longitudinal axis of the piston rod 24 is limited to 2° by an elongated pin 30 that extends into the block member 23 and is secured to the table 28. In this regard, it will be noted that the amount of rotation of the roller 20 is dependent upon the rotational speed of the bar 14 as well as its feed speed towards the spindle of the lathe. The bar-weight support 18 serves to carry the vertical weight of the bar 14 so that each of the support devices 16 is only concerned with controlling and preventing bar whip or whirl which may occur during the rotation of the bar 14. Only one of the bar-weight supports is shown, however, it will be understood that a number of identical supports would be provided at axially spaced locations along the stand 10 and each would have the cylinder 26 thereof pressurized sufficiently to support the weight of the bar 14.

The stand 10 is also provided with a plurality of identical bar positioners 32 each of which includes a vertically movable bracket 34 having a pair of rollers 36 and 38 which are rotatable about mutually perpendicular inclined axes. The bracket 34 is secured to a rod 40 which is guided for vertical sliding movement by a cylinder 42 rigid with a table 44 which is normally fixed with the stand 10 but is adjustable in position along the length thereof. The table 44 also supports an air operated cylinder 46, the piston rod portion of which is pivotally connected to one end of a bell crank 48 while the other end of the bell crank is connected to the rod 40. With the cylinder 46 expanded to the position shown in full lines in FIG. 1, the rollers 36 and 38 engage and support the lower peripheral portion of the bar 14. When the cylinder 46 is contracted, the bell crank 48 is rotated in a clockwise direction about its pivot connection 50 causing the rollers 36 and 38 to be moved vertically downwardly out of engagement with the bar 14. It is intended that the rollers 36 and 38 only be in the raised position when the bar 14 is loaded into the support devices 16 so the bar can subsequently be moved axially into the lathe. During this time, the bar-weight supports 18 will be in the lowered position and out of engagement with the peripheral portion of the bar 14.

Each of the support devices 16 made according to the invention includes a triangularly shaped base plate member 52 which is maintained in a vertical position when located on the stand 10 by a pair of elongated block members 54 and 56 rigid with a horizontal plate 58 fixed to the lower edge of the base plate member 52 by upright plate members 60 and 62. The block members 54 and 56 are movable along a pair of laterally spaced elongated ways 64 and 66 fixed with the top of the stand 10. As seen in FIG. 2, the way 66 is V-shaped in cross section and mates with a complimentary V-groove formed in the lower surface of the block member 56. Thus, the base plate member 52 is movable along the ways 64 and 66 to desired positions and can be fixed relative to the table through a locking arrangement 68 shown in FIG. 2.

As seen in FIG. 2, the front surface of the base plate member 52 supports three identical hydraulic cylinders 70, 72 and 74 in a common vertical plane with the longitudinal center axis of each hydraulic cylinder being angularly spaced from the longitudinal center axis of the adjacent cylinder by 120°. When the bar 14 is properly located in th support devices 16, the longitudinal center axis of each of the cylinders 70, 72 and 74 will pass through the longitudinal center of the bar 14. The base plate member 52 is formed with a J-shaped slot 76 as seen in FIG. 3, which provides a passage through which the bar 14 can be lowered into the full line operating position shown in FIG. 2.

As seen in FIG. 4, the hydraulic cylinder 70, as well as the other hydraulic cylinders 72 and 74, comprises relatively movable piston and cylinder members 78 and 80, respectively, with the piston member 78 being double ended and having the inner rod portion 82 thereof rigidly connected to an axially aligned cylindrical member 84 having a longitudinally extending cylindrical bore 86 formed therein that fixedly receives a shaft 88 connected to a fork 90. The member 84 is slidably mounted in a fixed support 91 which carries a guide pin 92 which limits rotation of the member 84 to 2° about the longitudinal center axis thereof for purposes hereinbefore explained. The fork 90 includes an axle 93 which rotatably supports a roller 94, the peripheral portion of which is formed with a tire 96 made from a resilient material such as rubber. The longitudinal center of the axle 93 is offset from the longitudinal center of the cylinder 70 so as to allow the roller 94 to function as a caster and allow the bar 14 to be fed axially into the lathe when desired.

The outer rod portion 98 of the piston member 78 terminates with a hat-shaped member 100 which is engaged at one end by a coil spring 102, the other end of which is seated within a cup 104 rigid with a screw 106 that is threadedly received in a support 108 and is axially aligned with the outer rod portion 98. A nut 110 serves to lock the screw 106 in position after the latter is fitted with and is rotated by a handle such as the handle 111 seen in FIG. 1. It will be noted that a guide stud 112 is fixed with the screw 106 and telescopes into the member 100 for allowing the latter to move relative to the cup 104. As will be more apparent as the description of the invention proceeds, the spring 102 serves to counterbalance the inertia of the roller and supporting mechanism including the piston member 78. In this regard, it will be noted that the guide stud 112 has an enlarged head 113 formed therewith which serves as a stop to preset the compression of the spring 102. Thus, when the screw 106 is advanced or retracted to position the roller 94 for a particular size bar 14, the compression loading on the spring 102 remains constant. The piston head 114 of piston member 78 divides the cylinder member 80 into inner and outer chambers 116 and 118 respectively and has equal pressure responsive areas. Thus, hydraulic fluid can be directed to the opposite sides of the piston head 114 for actuating the hydraulic cylinder.

The operation of the support devices will now be described in conjunction with the hydraulic circuit shown in FIG. 5, and it should be understood that the hydraulic cylinders of one support device only are incorporated in the disclosed circuit and that the hydraulic cylinders of the other support devices on the stand 10 would be fluidly interconnected so as to permit simultaneous operation of the corresponding cylinders.

The control circuit of FIG. 5 comprises a pump 120 which is connected by main conduits 122, 124 and 126 and branch conduits 128, 130, 132, 134, and 136 to the hydraulic cylinders 70, 72 and 74. The pump 120 draws fluid from a reservoir 138 through a conduit 140 and fluid can be returned to the reservoir through a conduit 142. The circuit incorporates a directional control valve 144 which is adapted to connect the conduits 126, 142 selectively to the conduits 122 and 124 or be positioned in the center so as to allow communication between conduits 124 and 142 but prevent fluid communication between conduits 122 and 126. The circuit also includes a conventional nitrogen-oil accumulator 146 which is connected by branch conduits 148 to main conduit 122. Each of the branch conduits 128, 130 and 132 has a flow control valve 150 which includes a check valve 152 and a restricted passage 154. A two position directional control valve 156 is located in conduit 148 and serves to connect the accumulator 146 with the outer chambers of the hydraulic cylinders 70, 72 and 74 when in one position and also has a second position for preventing communication between the accumulator 146 and the hydraulic cylinders.

Prior to loading the bar 14 into the support devices 16 shown in FIG. 1, pressurized air will be directed to the piston rod end of the air cylinder 26 of the bar-weight supports 18 so as to lower the roller 20. Pressurized air will then be directed to the base ends of the air cylinders 46 of the bar positioners 32 so as to cause the bell crank 48 to rotate in a counterclockwise direction to raise the bracket 34 to a predetermined position for receiving the bar. The position assumed by the bracket 34 of each of the bar positioners 32 will be dependent upon the diameter of the bar, the idea being that once the bar is supported by the rollers 36 and 38 as seen in FIG. 1, it will be centrally located within the lower portion of the slot 76 of the support devices 16 so that the periphery of the bar can be engaged by the rollers of the damping cylinders 70, 72 and 74. The directional control valve 144 is then positioned so as to connect the pump 120 with the conduit 124 and connect the conduit 122 with the reservoir. At the same time, the directional control valve 156 is positioned to prevent communication between the accumulator 146 and the outer chambers 118 of the hydraulic cylinders. Pressurization of the inner chambers 116 of the hydraulic cylinders causes the piston member 78 thereof to move radially outwardly against the bias of the spring 102 until the member 100 contacts the cup 104. This causes the rollers to move away from the center of lower portion of slot 36 a predetermined amount and if increased clearance is required, the handle 111 then can be utilized for retracting the screw 106 so as to move the cup 104 towards the support 108 and permit the piston member 78 to move further outwardly from the center of the lower opening in the slot 76. The bar 14 is then loaded through the slot 76 into the support devices 16 and onto the rollers 36 and 38 of the bar positioners 32. The bar 14 would then be moved axially into the lathe. Once the bar 14 has been properly chucked in the lathe, pressurized air would be directed to the base ends of the air cylinders 26 of the bar-weight supports 18 so as to cause the roller 20 of each bar-weight support 18 to engage the lower portion of the bar 14 and serve as the primary supports for the weight of the bar. This would be followed by positioning the directional control valve 144 so that the pump 120 is connected to the conduit 122 and the reservoir 138 is connected with the conduit 124. Thus, the outer chamber 118 is supplied with pressurized hydraulic fluid and the inner chamber 116 of each hydraulic cylinder is vented, permitting the piston member 78 to move radially inwardly towards the bar 14 and in contact therewith. At this juncture, it will be noted that various size bars can be used with this invention and that as seen in FIG. 4, each of the hydraulic cylinders are intended to have a scale 158 located adjacent the cup member 104. The scale 158 will allow the cup member 104 to be positioned properly for the particular diameter of the bar which is to be mounted in the support devices 16. Thus, assuming that the bar 14 has a diameter of $4\frac{1}{2}$ inches, and the outer chamber 118 is connected with the pump 120, then through the use of the handle 111 the roller 94 can be properly located for engagement with the periphery of the bar 14 and the spring force of spring 102 remains constant.

Once the bar 14 is contacted by the rollers 94 of the damping cylinders, the directional control valve 144 is positioned so as to close communication between the pump 120 and the conduit 122 and connect the inner chambers 116 of the damping cylinders to the reservoir 138 through conduits 124 and 142. The directional control valve 156 is also positioned so as to permit communication between the accumulator 146 and the outer chambers 118 of the hydraulic cylinders. The hydraulic cylinders of the support devices 16 are now in condition for controlling whip and whirl of the bar 14.

When the bar 14 rotates at a high speed and unbalance occurs so as to cause the bar to whip so that its central axis describes a circular orbit having its center point on the axis of rotation and assuming the radial movement of the bar causes the piston member 78 of hydraulic cylinder 70 to move radially outwardly, the fluid in the outer chamber 118 of cylinder 70 will flow through the restrictive passage 154 of the flow control valve 150 in conduit 132 and cause the pressure in the outer chamber 118 to rise and in this manner resist the radially outward force of the bar. At the same time, as the orbiting movement of the bar 14 causes the piston member 78 of the hydraulic cylinder 70 to move outwardly, it will simultaneously move away from one or the other or both of the rollers 94 associated with the hydraulic cylinders 72 and 74. When this occurs, the pressure in the accumulator 146 causes the piston member 78 in each of the hydraulic cylinders 72 and 74 to move radially inwardly so as to maintain contact with the bar 14 at all times. Pressure from the accumulator 146 to the hydraulic cylinders is communicated via the check valves 152 of the flow control valves 150 in the conduits 128 and 130. In this manner, the whipping action of the bar 14 is controlled and minimized.

A support device 16 according to the invention has been built and used in one test for controlling the whipping action of a hollow bar that was 5 feet long and had a 4.5 inch outer diameter and a 3 inch inner diameter. The bar was rotated at a speed of 2,000 rpm with a 5 in. lb. unbalance moment and the support device was located adjacent one end of the bar while the other end was clamped to the chuck of a lathe. Each of the rollers 94 associated with the hydraulic cylinders 70, 72 and 74 had a 4 inch diameter and was covered with a ¼ inch thick urethane tire and each of the hydraulic cylinders had a 2 inch bore. The accumulator 146 was charged to 20 psi and the orifice size of the restricted passage 154 of each flow control valve 150 was variable up to ⅛ inch diameter and the hydraulic conduits had a ¼ inch inner diameter. When the support device was not used, the bar exhibited whirling motion at all speeds because of the unbalance. When the unbalance was removed and the support device was not used, whirling motion occured at the critical speeds only which were found to be 500 rpm, 1100 rpm and 2200 rpm. When the support device described above was used and positioned adjacent the end of the bar, a smooth non-whirling operation was attained at all speeds. At the high range of speed and with the unbalance, a 1/32 inch orbit was observed which was less than the natural deflection of the bar due to its weight.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A support device for dampening the vibrational movement of an elongated rotating cylindrical bar, said support device comprising a base member supporting at least three hydraulic cylinders with the longitudinal center axis of each hydraulic cylinder being angularly spaced from the longitudinal center axis of the adjacent hydraulic cylinder by equal amounts and adapted to pass through the center of the bar, each of said hydraulic cylinders having an inner end located adjacent said center of the bar and an outer end, a piston member reciprocably mounted in each hydraulic cylinder having connecting rods extending from the inner and outer ends thereof and being sized so that the corresponding pressure responsive areas of said piston member on which fluid pressure acts to move said piston member in corresponding directions is equal for all hydraulic cylinders, a roller connected to the connecting rod of the piston members in each of said hydraulic cylinders adjacent the inner end thereof, spring means connected to the connecting rod of the piston member of each of said hydraulic cylinders adjacent the outer end thereof for counterbalancing the inertia of the roller and the piston member, a hydraulic circuit having a pump for selectively directing pressurized hydraulic fluid to the chambers at the outer and inner ends of each of said hydraulic cylinders for adjusting the position of the roller relative to the outer periphery of said bar, said hydraulic circuit including an accumulator, conduit means for fluidly connecting the outer ends of the three hydraulic cylinders to said accumulator, and a flow control valve located in said conduit means between each hydraulic cylinder and the accumulator for dampening vibratory movement of the bar during high speed rotation thereof.

2. In combination with an elongated stand adapted to be positioned adjacent a metal cutting machine and support an elongated rotating cylindrical bar, a plurality of support devices for dampening the vibrational movement of said elongated rotating cylindrical bar, each of said support devices comprising a vertically oriented base plate member having a J-shaped slot formed therein, said base plate member adapted to be adjustably locked to supporting three hydraulic cylinders located in a common vertical plane with the longitudinal center axis of each hydraulic cylinder being angularly spaced from the longitudinal center axis of the adjacent cylinder by 120° and adapted to pass through the center of the bar, each of said hydraulic cylinders having an inner end located adjacent said center of the bar and an outer end, a piston member reciprocably mounted in each hydraulic cylinder having connecting rods extending from the inner and outer ends thereof and being sized so that the corresponding pressure responsive areas of said piston member on which fluid pressure acts to move said piston member in corresponding directions is equal for all hydraulic cylinders, a roller connected to the connecting rod of the piston member in each of said hydraulic cylinders adjacent the inner end thereof, spring means carried by the base member and connected to the connecting rod of the piston member of each of said hydraulic cylinders adjacent the outer end thereof for counterbalancing the inertia of the roller and the piston member, a hydraulic circuit having a pump for selectively directing pressurized hydraulic fluid to the chambers at the outer and inner ends of each of said hydraulic cylinders for adjusting the position of the roller relative to the outer periphery of said bar, said hydraulic circuit including an accumulator, conduit means for fluidly connecting the outer ends of the three hydraulic cylinders to said accumulator, a flow control valve having a restricted passage located in said conduit means between each hydraulic cylinder and the accumulator for dampening vibratory movement of the bar during high speed rotation thereof, said flow control valve including a check valve for allowing fluid to flow unrestricted in only one direction toward the outer end of the associated cylinder so as to maintain the roller in contact with the bar, and a plurality of bar-weight supports provided along the length of the stand for supporting the vertical weight of said bar during rotation thereof so that said weight is not carried by said hydraulic cylinders.

* * * * *